(12) United States Patent
Mohan et al.

(10) Patent No.: US 9,692,651 B2
(45) Date of Patent: Jun. 27, 2017

(54) METHOD AND APPARATUS FOR IMPROVING NETWORK PERFORMANCE

(75) Inventors: Saravanan Mohan, Chennai (IN); Nadhira Abdul Rasheed, Chennai (IN); Ishwarya Sridhar, Chennai (IN); Nalini Srinivasan, Vellore (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 147 days.

(21) Appl. No.: 14/391,676

(22) PCT Filed: Aug. 22, 2012

(86) PCT No.: PCT/EP2012/066340
§ 371 (c)(1),
(2), (4) Date: Oct. 9, 2014

(87) PCT Pub. No.: WO2013/152815
PCT Pub. Date: Oct. 17, 2013

(65) Prior Publication Data
US 2015/0071120 A1    Mar. 12, 2015

(30) Foreign Application Priority Data
Apr. 13, 2012 (IN) .......................... 1160/DEL/2012

(51) Int. Cl.
*H04L 12/28* (2006.01)
*H04J 99/00* (2009.01)
(Continued)

(52) U.S. Cl.
CPC .......... *H04L 41/083* (2013.01); *G06Q 10/00* (2013.01); *H04L 12/1813* (2013.01); *H04L 41/12* (2013.01); *H04L 43/045* (2013.01)

(58) Field of Classification Search
CPC . H04L 12/16; H04L 12/1813; H04L 12/2424; H04L 12/26; H04L 12/2634;
(Continued)

(56) References Cited

U.S. PATENT DOCUMENTS

| | | | |
|---|---|---|---|
| 6,748,429 B1* | 6/2004 | Talluri | G06F 9/5061 709/221 |
| 2005/0114478 A1* | 5/2005 | Popescu | H04L 12/185 709/220 |

(Continued)

OTHER PUBLICATIONS

International Search Report and Written Opinion of the International Searching Authority, PCT Application No. PCT/EP2012/066340, Jan. 24, 2013.

*Primary Examiner* — Lonnie Sweet
(74) *Attorney, Agent, or Firm* — Patent Portfolio Builders, PLLC

(57) ABSTRACT

A method for improving performance of a network includes identifying at least two communities of users within the network, analysing a structure of each community and clustering the communities according to community performance. The method further includes comparing a structure of a lower performing community with a structure of a higher performing community, and changing the structure of the lower performing community substantially to resemble the structure of the higher performing community. Related computer program product for carrying out a method of introducing connections among users of a network and an apparatus configured to introduce connections among users in a network are disclosed.

16 Claims, 7 Drawing Sheets

(51) Int. Cl.
*H04L 12/24* (2006.01)
*G06Q 10/00* (2012.01)
*H04L 12/18* (2006.01)
*H04L 12/26* (2006.01)

(58) Field of Classification Search
CPC ..... H04L 12/28; H04L 41/08; H04L 41/0803; H04L 41/0813; H04L 41/085; H04L 41/0866; H04L 41/12
See application file for complete search history.

(56) References Cited

U.S. PATENT DOCUMENTS

2005/0143966 A1* 6/2005 McGaughy ......... G06F 17/5036
703/3
2011/0071953 A1* 3/2011 Shen ..................... G06Q 30/02
705/319

* cited by examiner

| Community | 13 | 154 | 1269 | 2007 |
|---|---|---|---|---|
| Nodes | 6593 | 877 | 6303 | 3591 |
| Links | 15655 | 1225 | 11702 | 5138 |
| Type4 | 67651 | 4445 | 46909 | 18742 |
| Type5 | 20283 | 340 | 12304 | 2478 |
| Type6 | 56226 | 1736 | 34819 | 8937 |
| Type7 | 24413 | 285 | 9031 | 1292 |
| Type8 | 48174 | 1331 | 20115 | 4768 |
| Type9 | 1441 | 87 | 784 | 220 |
| Type10 | 190 | 6 | 96 | 29 |
| Type11 | 10174 | 111 | 2522 | 320 |
| Type12 | 541 | 17 | 187 | 32 |
| Type13 | 982 | 51 | 367 | 125 |
| Type14 | 796 | 32 | 318 | 47 |
| Type15 | 1587 | 47 | 416 | 68 |
| Type16 | 0 | 0 | 0 | 0 |
| Triads | 232458 | 8488 | 127868 | 37058 |
| Call Cost | 1036462.1 | 123116.4 | 637285.2 | 233151.2 |

| Community | 0 | 2 | 52 | 13 |
|---|---|---|---|---|
| Nodes | 93 | 139 | 255 | 754 |
| Links | 360 | 588 | 1158 | 4140 |
| Type4 | 0 | 0 | 0 | 0 |
| Type5 | 0 | 0 | 0 | 0 |
| Type6 | 0 | 0 | 0 | 0 |
| Type7 | 0 | 0 | 0 | 0 |
| Type8 | 0 | 0 | 64 | 0 |
| Type9 | 0 | 0 | 0 | 0 |
| Type10 | 0 | 0 | 0 | 0 |
| Type11 | 384 | 1075 | 2965 | 1221 |
| Type12 | 0 | 0 | 0 | 0 |
| Type13 | 0 | 0 | 6 | 0 |
| Type14 | 0 | 0 | 0 | 0 |
| Type15 | 124 | 185 | 413 | 14917 |
| Type16 | 0 | 0 | 0 | 0 |
| Triads | 508 | 1260 | 3448 | 16138 |

| Community | Nodes | Links | Call Cost | Call Duration |
|---|---|---|---|---|
| 13 | 6593 | 15655 | 1036462.1 | 1181959 |
| 1269 | 6303 | 11702 | 637285.15 | 669406 |

| Community | Nodes | Links | Call Cost | Call Duration |
|---|---|---|---|---|
| 13 | 6593 | 15655 | 1036462.1 | 1181959 |
| 1269 | 6303 | 36310 | 1058873.6 | 1072014 |

| Community | Nodes | Links | Triads | Cluster |
|---|---|---|---|---|
| 13 | 6593 | 15655 | 232458 | cluster1 |
| 1269 | 6303 | 11702 | 127868 | cluster1 |
| 2007 | 3591 | 5138 | 37058 | cluster0 |

| Community | Nodes | Links | Triads | Cluster |
|---|---|---|---|---|
| 13 | 6593 | 15655 | 232458 | cluster1 |
| 1269 | 6303 | 11702 | 127868 | cluster1 |
| 2007 | 3591 | 13352 | 52086 | cluster1 |

METHOD AND APPARATUS FOR IMPROVING NETWORK PERFORMANCE

CROSS REFERENCE TO RELATED APPLICATION

This application is a 35 U.S.C. § 371 national stage application of PCT International Application No. PCT/EP2012/066340, filed on 22 Aug. 2012, which itself claims priority to Indian Application No. 1160/DEL/2012, filed 13 Apr. 2012, the disclosures and contents of both of which are incorporated by reference herein in their entirety. The above-referenced PCT International Application was published in the English language as International Publication No. WO 2013/152815 A1 on 17 Oct. 2013.

TECHNICAL FIELD

The present invention relates to a method for improving network performance and to an apparatus and computer program product for introducing connections among users of a network.

BACKGROUND

Communication networks are widely used across many industries and sections of society. Such networks may include, for example, telecommunications networks, social media networks, office networks, academia networks and community networks. The use of communication networks is growing, with continual expansion of customer bases and a steady flow of innovation providing new ways to connect and interact with other users within a network. The communication network itself provides a framework, allowing diverse groups of individuals to form connections and exchange information within the network. Connections between individual users within the network may take various forms including friendship, professional relations, common interests, shared beliefs, knowledge or backgrounds. A full service network provides a broad range of connection and communication options as well as an array of additional and value added services. Usage information may be extracted from such networks and can form the basis of personalised service offerings provided to customers according to their individual needs and interests.

There is considerable interest in being able to assess and optimise the performance of a communication network, with a view to maximising the value of the network to the network operator. The general approach to such assessment is to rank individual network customers according to their usage. However, this approach provides only limited insight to the true functioning of the network. Communication networks are often highly complex and dynamic structures within which the nature and quantity of social activity and interaction may rapidly evolve.

Another approach to assessment of communication networks is to form a graphical representation of the network, thus allowing the use of graph based algorithms and other mathematical tools. Individual users within a network may be known as nodes and referred to as vertices V on the graph, with the communication ties between nodes known as links and referred to as edges E on the graph. The network may thus be represented as a graph $G(V, E)$ where V is the node set of n nodes and E the link set of links between the nodes. When considering a graphical representation of a typical communication network, the distribution of links can be seen to be both globally and locally inhomogeneous, with a high distribution of links within particular groups of nodes and low distribution of links between the groups. This feature of real networks is known as community structure and can be a key driver of customer behaviour within a network.

There exist various tools for attempting to analyse the local structure of graphically represented networks. These include for example the identification of small subgraphs of nodes, most notably dyads and triads. A dyad is a subgraph of two nodes and the possible links between them. A triad is a subgraph of three nodes and the possible links between them. Once identified, dyads and triads may be classified according to the number and nature of links between their constituent nodes.

The above analysis tools may be employed in attempting to enhance the performance of a communication network. For example, new connections may be suggested to users based upon usage data or an existing shared connection. However, simply introducing new connections within the network does not necessarily translate to increased traffic through the network and the speed and efficiency with which network performance may be enhanced is therefore relatively limited.

SUMMARY

It is an aim of the present invention to provide a method and apparatus which obviate or reduce at least one or more of the disadvantages mentioned above.

According to a first aspect of the present invention, there is provided a method for improving performance of a network. The method comprises identifying at least two communities of users within the network, analysing a structure of each community and clustering the communities according to community performance. The method further comprises comparing a structure of a lower performing community with a structure of a higher performing community; and changing the structure of the lower performing community substantially to resemble the structure of the higher performing community.

The present invention thus addresses the issue of network performance on a community level. The present inventors have found that by focussing on individual communities within a network, overall network performance can be improved faster and more efficiently, and hence more profitably, owing to a higher percentage of network traffic taking place within communities. The present inventors have also found that community structure may be directly associated to community performance. The present invention thus addresses the complex and challenging question of community performance through the more tangible and quantifiable attribute of community structure. The present invention also identifies a high performing community for use as a reference structure, setting that structure as a target structure to be established in a lower performing community in order to improve the performance of the lower performing community.

According to an embodiment, the structure of each community which is analysed may be a triadic structure. The triadic structure may provide an effective vehicle for analysis of community structure on a local scale.

According to another embodiment, comparing a structure of a lower performing community with a structure of a higher performing community may comprise conducting an isomorphic comparison of triad structures. This may allow the establishment of an accurate measure of structural similarity between communities as well as facilitating subsequent structural transformation.

The comparison between communities may be conducted between communities having a comparable number of users. In this manner, the value of the comparison exercise may be increased, by thus identifying lower performing communities which have the potential for much greater structural interconnection and hence improved performance.

For the purposes of the present specification, the word "comparable" when referring to the number of nodes within a community is a contextual standard including a certain margin for error but not requiring exact or even approximate similarity. For example "comparable" when referring to communities having of the order of 10 nodes might include a variance of up to 3 nodes between communities. In contrast, when referring to communities having many thousands of nodes, a difference of several hundred nodes between communities may be encompassed within the term "comparable".

According to an embodiment, analysing a structure of each community may comprise identifying triads within each community and analysing a structure of each triad.

For the purposes of the present specification, the word "structure" when referring to a triad may include within its scope one or more structural properties of the triad or may encompass the full structural type of the triad. According to an embodiment, the identification and analysis of triad structure may be conducted as part of a triad census. Triadic analysis may enable accurate understanding of community structure on a local scale and may thus lend itself to the subsequent structural comparison between communities encompassed within embodiments of the present invention.

According to an embodiment, clustering the communities according to community performance may comprise clustering the communities according to triad structure.

According to another embodiment, changing the structure of the lower performing community may comprise identifying open triads and effecting closure.

Effecting closure may comprise conducting focal closure. For the purposes of the present specification, "focal closure" refers to the process of identifying a shared focus between two notes and introducing a link between the nodes according to the shared focus. In this manner, the invention may prioritise the creation of meaningful links that are most likely to result in increased traffic for the network.

Effecting closure may additionally or alternatively comprise conducting triadic closure. In this manner, the invention may create a maximum number of new links in the community.

According to an embodiment, the network may comprise a telecommunications network.

According to another embodiment, the network may comprise a social network. The social network may be any kind of social network and may for example comprise a web based social networking service, platform or site.

According to another aspect of the present invention, there is provided a computer program product for carrying out a method of introducing connections among users of a network. The method comprises identifying at least two communities of users within the network, identifying triads within each community, analysing a structure of each triad and clustering the communities according to triad structure. The method further comprises identifying a lower performing community cluster and a higher performing community cluster, conducting an isomorphic comparison of a structure of a lower performing community with a structure of a higher performing community, and changing the structure of the lower performing community substantially to resemble the structure of the higher performing community.

According to an embodiment, the identification and analysis of triad structure may be conducted as part of a triad census.

Changing the structure of the lower performing community may comprise conducting focal closure. In this manner, the invention may prioritise the creation of meaningful links that are most likely to result in increased traffic for the network.

Changing the structure of the lower performing community may additionally or alternatively comprise conducting triadic closure. In this manner, the invention may create a maximum number of new links in the community.

According to an embodiment, the comparison between communities may be effected between communities having a comparable number of users. In this manner, the value of the comparison exercise may be increased, by thus identifying lower performing communities which have the potential for much greater structural interconnection and hence improved performance.

According to an embodiment, the network may comprise a telecommunications network.

According to another embodiment, the network may comprise a social network. The social network may be any kind of social network and may for example comprise a web based social networking service, platform or site.

According to another aspect of the present invention, there is provided an apparatus configured to introduce connections among users in a network. The apparatus comprises a community identifying unit configured to identify communities within the network, a community analysing unit configured to identify triads within each community and to analyse a structure of each triad and a clustering unit configured to cluster the communities according to triad structure. The apparatus further comprises an identifying unit configured to identify a lower performing community cluster and a higher performing community cluster, a comparison unit configured to conduct an isomorphic comparison of a structure of a lower performing community with a structure of a higher performing community, and a structural change unit configured to change the structure of the lower performing community substantially to resemble the structure of the higher performing community.

According to an embodiment, the structural change unit may be configured to effect structural change through focal closure.

According to another embodiment, the structural change unit may be configured to effect structural change through triadic closure.

According to an embodiment, the community analysing unit may be configured to conduct a triad census.

According to an embodiment, the comparison unit may be configured to conduct an isomorphic comparison of structures of communities having a comparable number of users.

According to an embodiment, the network may comprise a telecommunications network.

According to another embodiment, the network may comprise a social network. The social network may be any kind of social network and may for example comprise a web based social networking service, platform or site.

BRIEF DESCRIPTION OF THE DRAWINGS

For a better understanding of the present invention, and to show more clearly how it may be carried into effect, reference will now be made, by way of example, to the following drawings in which.

DETAILED DESCRIPTION

Figure 1:
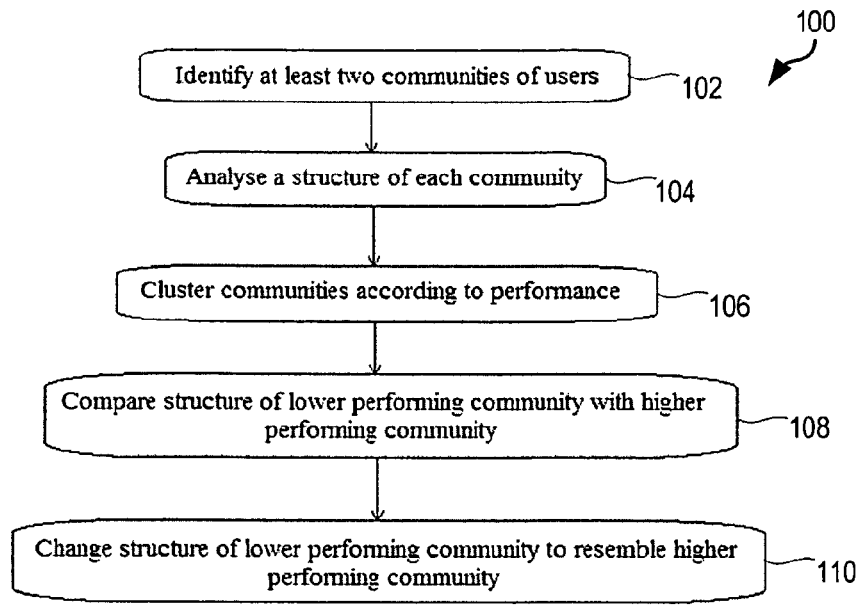
FIG. 1 is a flow chart illustrating steps in a method for improving network performance.

FIG. 1 illustrates steps in a method 100 for improving performance of a network in accordance with an embodiment of the present invention.

With reference to FIG. 1, a first step 102 of the method involves the identification of at least two communities of users within the network. Once the individual communities of the network have been identified, the structure of the communities is analysed in step 104. The communities are then clustered according to community performance within the network, at step 106. Subsequently, a structure of a community from a lower performing cluster is compared with a structure of a community from a higher performing cluster at step 108. Finally, at step 110, the structure of the lower performing community is changed substantially to resemble the structure of the higher performing community.

As noted above, according to conventional methods, network performance is addressed globally, on the scale of the entire network. Information such as usage or connectivity data may be employed to assist in the evaluation of network performance. However, real networks tend not to be homogeneous units but exhibit community structure, meaning that networks may have properties at the community level that are quite different form those exhibited at the global level. The present inventors have discovered that conventional analysis focussing on global properties may ignore many useful and interesting properties of the network that are exhibited on a community scale. The present invention thus provides a new approach to assessing and improving the performance of a network, by addressing network performance on a community level.

An important indicator of network performance is the traffic of information through the network. The present inventors have found that between 80% and 90% of network traffic may take place within communities, compared to only 10% to 20% of traffic that may take place between communities. The present invention seeks to improve the performance of individual communities, and thereby takes a highly efficient approach to improving overall network performance.

According to the present invention, identifying of communities at step 102 may be conducted in various different ways. A community is generally defined as a relatively tightly interconnected group of nodes, having relatively fewer connections to the rest of the network. The process of identifying communities therefore involves identifying those groups of nodes within the network which have significantly more connections between members of the group than with nodes outside the group. A robust approach to such identification is known as "modularity", and embodiments of the present invention may employ a modularity based algorithm for community identification.

Following identification of communities within the network, the method of the present invention proceeds at step 104 to analysis of the structure of the identified communities. The present inventors have found that community performance may be directly associated with community structure, and that community structure may thus be employed not only as an aid to analysis of community performance, but as a tool in actively manipulating community performance.

As noted above, a triad is a basic structural unit that exists in networks, and hence also in communities within networks. A triad is a unit comprising three nodes and the links between those nodes. Triads can be used as an analysis tool linking qualitative local network patterns to global network structures and properties.

Figure 2:
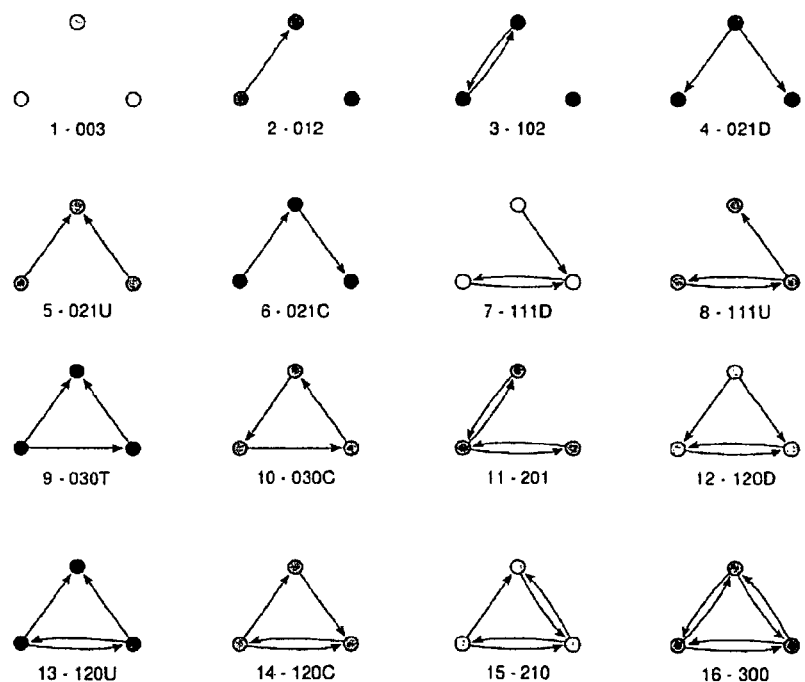
FIG. 2 shows sixteen types or classes of triad.

Each triad that exists within a directed network is isomorphic with one of sixteen possible isomorphism classes or types of triad. The sixteen triad types are illustrated in FIG. 2, together with the type number and notation associated with the type. The standard MAN notation for triads counts the number of mutual, or reciprocated links M, the number of asymmetric or unreciprocated links A and the number of null links N.

Where there is more than one triad type having the same number of mutual, asymmetric and null links, a letter is used to indicate the directionality of the links between nodes, and so to distinguish between triad types. It will be appreciated that in an undirected network, only four triad types are possible: 003, 102, 201 and 300. In both directed and undirected networks, triads can be classified as null, dyadic or connected. A null triad includes no links between the nodes, and has the notation 003. This is illustrated as type 1 in FIG. 2. A dyadic triad includes connections between only two of the nodes and may have the notation 012 or 102. These are illustrated as types 2 and 3 in FIG. 2. Connected triads include connections between at least two of the nodes. Each of types 4 to 16 as represented in FIG. 2 is a connected triad. Connected triads may be classed into two broad groups: open triads, in which two of the nodes are not connected to each other, and closed triads, where all three nodes are interconnected forming a closed triangle.

According to an embodiment of the present invention, triadic structure is used in step 104 as the basic unit of structural analysis for the identified communities. The analysis may take the form of a triad census, in which triadic structure is identified and the number of each type of triad appearing within a community is counted. A standard triad census identifies all sixteen types of triad, including null and dyadic triads. However, according to an embodiment of the present invention, the triad census conducted as part of the analysis step 104 focuses only on connected triads, which may be open or closed. The triad types identified thus range form type 4 to type 16 but do not include types 1, 2 or 3. This focus on identifying connected triads reflects an aim of the invention to change the structure of a lower performing community to resemble that of a higher performing community. This is discussed in further detail below, with reference to the process of changing community structure conducted at step 110.

According to an embodiment of the present invention, a triad census algorithm employed to achieve the community structure analysis of step 104 may comprise the following steps:
1. Identify existing nodes and links between nodes within the communities.
2. Input the links existing in each community to identify number of triads present in each community.
3. Analyse the common point between every pair of connected dyads.
4. If a pair of connected dyads has a shared node (a mutual friend) then they form a triad.
5. Obtain the MAN code associated with each identified triad.
6. Use a lookup table to map the triad code to its respective triad type (type 4 to type 16).
7. Count the number of triads of each type within each community.

In one example, the triad census algorithm may be:

```
Input ; Edges E ∈ G (V,E)
    for each (u_i, v_i) ∈ E do
        for each (u_{i-1}, v_{i-1}) ∈ E do
            begin
                begin
            if there exist a common node w then
                triad=triad U (u,v,w)
            end
    end
for each triad do begin
        triad_type=Tricode(triad)
        triad_census[triad_type]+=1
end
function Tricode(u,v,w : vertex) begin
return link(u,v) + 2 *
(link(u,v)+2*(link(v,w)+2*(link(w,v)+2*(link(u,w)+2*(link(w,u))))))
```

Figures 7, 8:
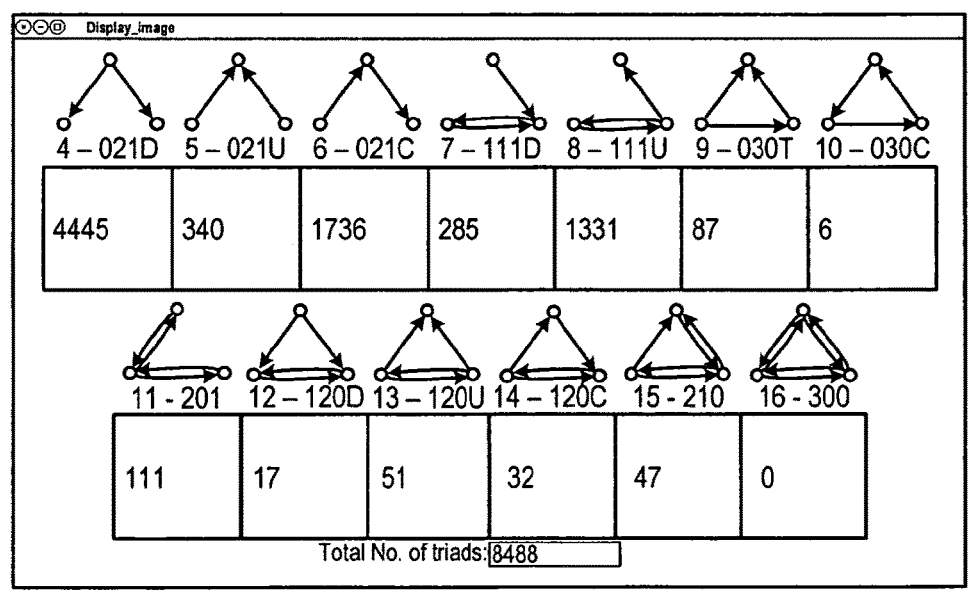
FIG. 7 shows sample community details of a telecommunications network.
FIG. 8 shows the triadic structure of a community from the network of FIG. 7.

The results of the triad census may be presented in table format, for example as shown in FIG. 7. The number of triads of each type present within each community may be displayed in a results table, allowing the predominant triad structure for each community to be identified. This predominant triad structure indicates the most common form of communication between the nodes in the community and helps to explain the performance of the community. The predominant triad type is likely to vary between communities and between networks of different types, as discussed in further detail below.

Figure 3:
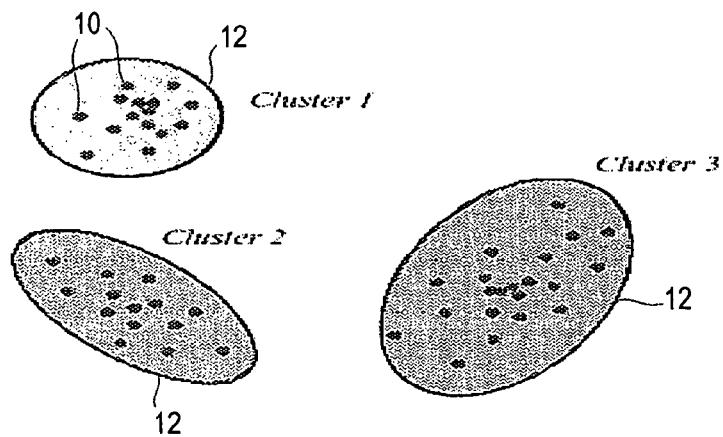
FIG. 3 is a representative image of three clusters.

Following analysis of the structure of each community, the method proceeds to step 106, in which communities are clustered according to performance. Clustering is the process of assigning the communities into groups, or clusters, so that communities in the same cluster are more similar to each other than they are to communities in other clusters. An example of a clustered set of communities is illustrated in FIG. 3. Each community 10 is represented as a dot, with the communities 10 being grouped into three different clusters 12. Many clustering algorithms exist in the art and according to one embodiment of the invention, a K-means algorithm is used to cluster the communities according to community performance.

A range of measures exist to assess performance within a network, however these may not easily lend themselves to cluster analysis or to subsequent community manipulation. The present invention uses the above discussed association between community structure and community performance to allow clustering of communities according to their performance. The clustering algorithm is applied to the triadic community structure revealed by the triad census, resulting in separation of loosely coupled, lower performing communities into a first cluster group, and tightly coupled, higher performing communities into a second cluster group. The relation between community structure and community performance means that communities clustered according to structure are necessarily also clustered according to their performance.

Following clustering of the identified communities, the method then proceeds to step 108, in which a structure of a lower performing community is compared with a structure of a higher performing community. First, suitable lower and higher performing communities are selected for comparison, for example one from each of the lower performing and higher performing clusters. It may be desirable that the communities selected be of a comparable size, by which is meant that the number of nodes within each of the communities selected for comparison is sufficiently similar that a comparison between the communities is appropriate. "Comparable" is thus a contextual standard, encompassing a certain margin for error according to the order of magnitude of the number of nodes under consideration. For example, when considering very small communities having of the order of 10 nodes, a variance of up to 3 nodes between communities may be considered acceptable for comparison. In contrast, when considering communities having many thousands of nodes, a difference of several hundred nodes between communities may be acceptable. Selecting communities of comparable size for structural comparison helps to identify those communities having the greatest potential for improvement in performance. A loosely connected, lower performing community that is of similar size to a tightly connected, higher performing community is likely to have a good potential for performance improvement.

According to an embodiment of the present invention, the comparison between the selected lower and higher performing community structures is an isomorphic comparison, in which structural similarity between the communities is measured:

$$\mu(c,c^J)=1-[mcs(c,c^J)/\max(c,c^J)]$$

where:
$\mu(c,c^J)$ is the similarity measure;
$mcs(c, c^J)$ is the maximum common structure between the community c and $c^J$; and
$\max(c,c^J)$ is the maximum number of nodes that can exist in either of the community.

The isomorphic comparison allows for progression of the method to step 110, in which the structure of the lower performing community is changed to increase the similarity measure between the communities. In this manner, the structure of the lower performing community may be brought to substantially resemble the structure of the higher performing community. The higher performing community is thus used as a reference, or template, and structural matching is performed to manipulate the structure of the lower performing community to more closely resemble the structure of the higher performing community. Individual structural changes may be made in a continuous process until the desired level of similarity is reached. This may involve repeated comparison to track the progress of the structural matching, and the step 110 of changing a structure of the lower performing community may therefore include within its scope the step of repeated further comparison between the structures of the lower and higher performing communities to allow tracking of the progress of the structural matching.

Figure 4:
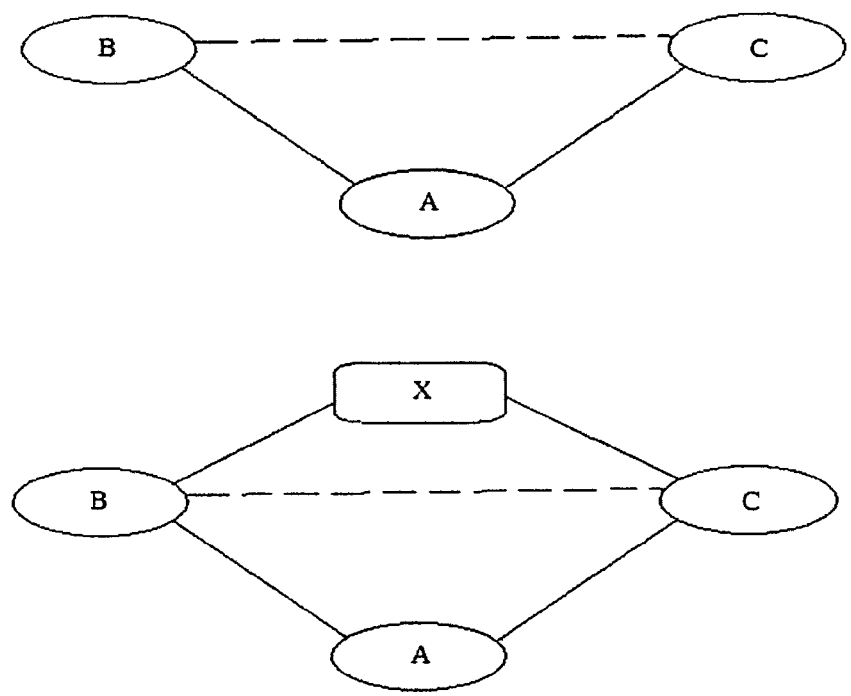
FIG. 4 is a representative image illustrating triadic and focal closure.

According to embodiments of the invention, the structural change of step 110 may be accomplished through the use focal and/or triadic closure techniques. These two techniques are represented graphically in FIG. 4.

The principle of triadic closure suggests that if A, B and C represent a triad of nodes or users within a network, and if B and C share a mutual connection with A, then a connection between B and C can be established. This is a comparatively simple closure technique based purely on a shared connection with another node.

The principle of focal closure differs form triadic closure in targeting a shared focus between nodes rather than merely a shared connection to another person or node. The shared focus may be a shared interest, activity, location or other feature. As for triadic closure, focal closure is applied to an open connected triad, and thus to a pair of unconnected nodes who share a common connection to a third node. Thus in the illustrated example, focal closure is applied to nodes B and C who have a shared connection to node A. However, according to focal closure, the shared connection to A is not sufficient to form a new connection between B and C. The process of focal closure goes a step further in identifying a focus X that is shared between B and C. The principle is that if B and C share a focus in the form of a common interest, activity, location etc., then they are likely to share a certain level of similarity, and there is an increased chance of communication being established between them on the basis of the shared focus, even if neither B nor C is aware of the shared connection to A. The process of focal closure takes account of a feature of social networks known as homophily, which is the tendency of individuals to associate and bond with those who are similar. Thus a point of similarity, or shared focus between individuals is a good indication of potential for a productive link between the individuals.

The use of focal and/or triadic closure to effect the desired structural change in the lower performing community is one of the underlying reasons for identifying only connected triads in the triad census discussed above. Both focal and triadic closure are conducted on connected triads, rather than null or dyadic triads, and hence the triad census is concerned with identifying only connected triads, on which focal or triadic closure may be conducted to modify the structure of the lower performing community to resemble the structure of the higher performing community.

According to one embodiment of the present invention, focal closure is employed to effect the required structural changes in the lower performing network. New connections between nodes of the community are established using a focal closure algorithm which:
1. Extracts the nodes and their interests from a dataset,
2. Searches for a mutual interest between the unconnected pairs of nodes in open triads, and
3. Establishes a link between unconnected pairs of nodes in open triads that have been found to share a mutual interest.

In one example, the focal closure algorithm may be:

```
Input: (V,E) ∈ G with specific focus
Output : Graph with increased closed triads
method :
for each open_triad (u,v,w) do begin
    if (u, v) ∈ E and (v, w) ∈ E then
        if interest[u] and interest[w] are same then
            add an edge ( u , w ) to E
end
```

By identifying a common focus as a condition for establishing a connection between unconnected nodes of a triad, focal closure prioritises the forming of connections that are most likely to result in communication and sharing of information between the nodes, and hence in improved community performance.

The method of the present invention may be implemented in hardware, or as software modules running on one or more processors. The method may also be carried out according to the instructions of a computer program, and the present invention also provides a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

Figure 5:
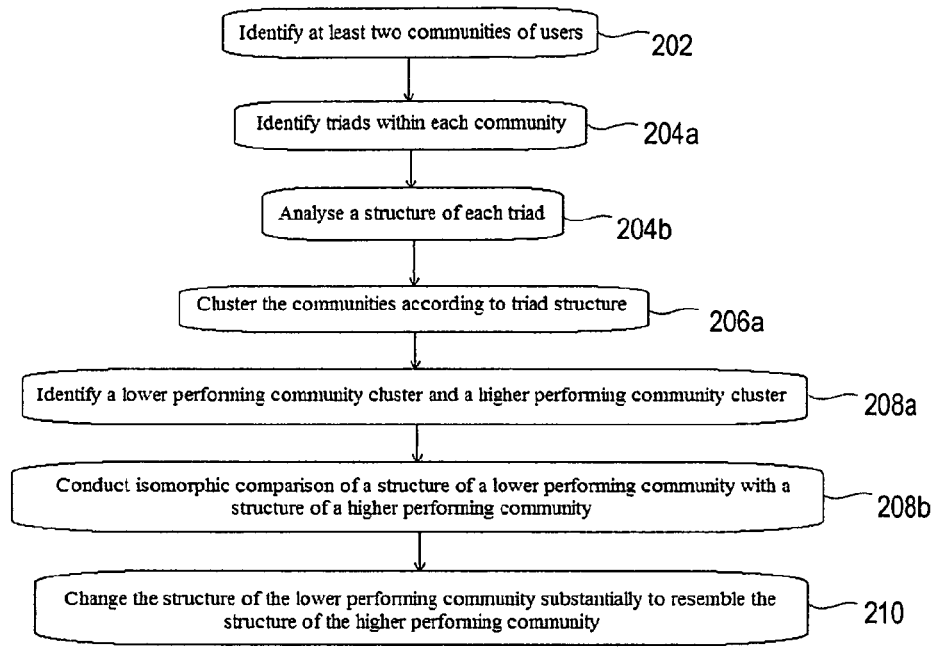
FIG. 5 is a flow chart illustrating steps in a method for introducing connections among users of a network.
Figure 6:
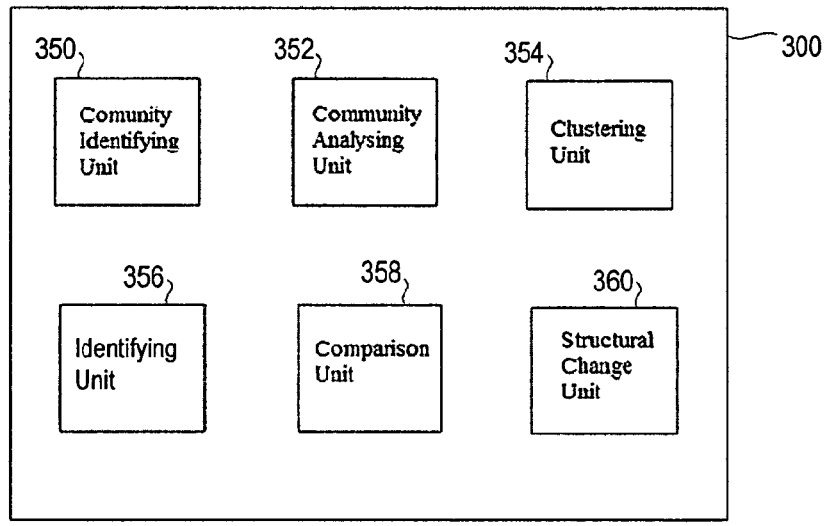
FIG. 6 shows an apparatus configured to introduce connections among users in a network.

FIG. 5 illustrates how the method steps of FIG. 1 may be broken down into the functional steps which a computer program may cause a system, processor or apparatus to execute, which are described below in combination with FIG. 6. FIG. 6 illustrates functional units of an apparatus 300 which may execute the method steps.

The apparatus 300 may for example comprise a processor, a system node or any other suitable apparatus.

According to one embodiment, the apparatus 300 comprises a community identifying unit 350, a community analysing unit 352, a clustering unit 354, an identifying unit 356, a comparison unit 358 and a structural change unit 360. It will be understood that the units of the apparatus are functional units, and may be realised in any appropriate combination of hardware and or software.

Referring both to FIGS. 5 and 6, in a first step 202 the computer program causes the community identifying unit 350 to identify at least two communities of users within the network. The community identifying unit may employ a modularity based algorithm to identify the communities, as discussed above. Following this, in a step 204*a*, the computer program causes the community analysing unit to identify triads within each community, and in a step 204*b*, the computer program causes the community analysing unit 352 to analyse a structure of each triad. The structural analysis may comprise maintaining a count of the number of each type of triad identified. The community analysing unit may perform steps 204*a* and 204*b* as part of a triad census procedure, as discussed in detail above.

In a subsequent step 206*a*, the computer program causes the clustering unit to cluster the identified communities according to triad structure. Following this, in step 208*a*, the computer program causes the identifying unit 356 to identify a lower performing community cluster and a higher performing community cluster, and to identify a lower performing community and a higher performing community from these clusters that are suitable for comparison. Then, in step 208b, the computer program causes the comparison unit 358 to conduct an isomorphic comparison of a structure of the lower performing community with a structure of the higher performing community. Finally, in step 210, the computer program causes the structural change unit 360 to effect focal closure in order to change the structure of the lower performing community to substantially resemble the structure of the higher performing community.

In one embodiment, the structural change unit may also effect triadic closure in order to bring about the required structural change in the lower performing community.

An implementation of an embodiment of the present invention will now be discussed with reference to FIGS. 7 to 17. The following discussion uses as an example a telecommunications network. The invention may also be implemented in other types of network including for example a social network, with similar results. An example social network is also briefly discussed below. These network types are discussed merely as examples of how embodiments of the present invention may be implemented, and the results which may be achieved, and do not therefore in any way limit the scope of application of the present invention.

FIG. 7 illustrates a partial data set for a telecommunications network. The telecommunications network includes 60420 nodes, having 128198 links between them. Following community identification, a total of 2857 communities may be identified within the network. The table of FIG. 7 illustrates structural analysis details for those communities of the network having more than 100 nodes. The table can be seen to include the number of each type of triad within each community, ranging form type 4 to type 16. The total number of triads within each community and the total call cost for each community are also indicated. The structural analysis details for community 154 are also illustrated pictorially in FIG. 8, which includes a representative illustration of each triad type from 4 to 16. The number of triads of each type found within community 154 is noted beneath the representative illustrations. Consideration of FIGS. 7 and 8 indicates that the predominant triad type for all the communities considered is type 4. This is the least interconnected of the triad types under consideration, and indicates that the communities are relatively loosely coupled, having a large spread of information within the communities and relatively low levels of interconnection.

Figures 9, 10:
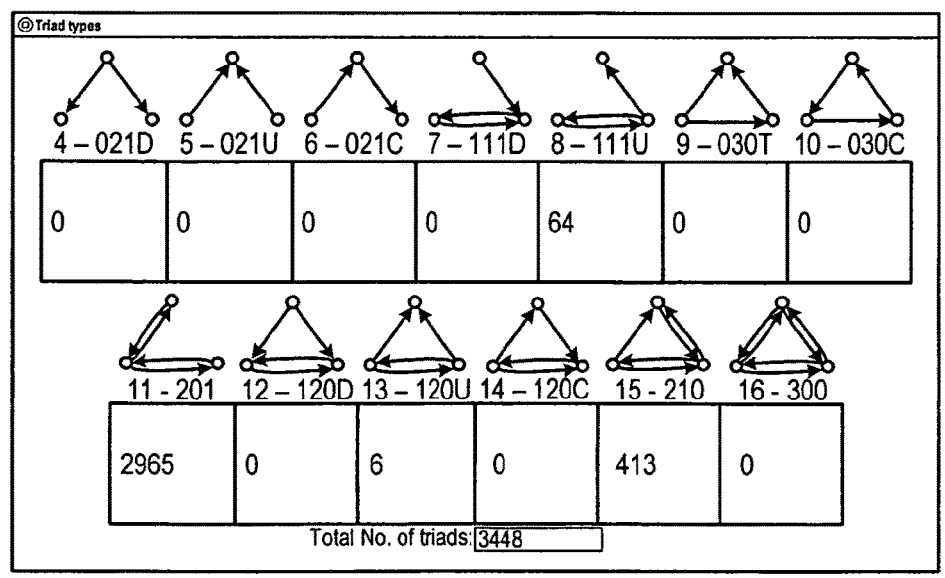
FIG. 9 shows sample community details of a social network.
FIG. 10 shows the triadic structure of a community from the network of FIG. 9.

The connection levels of the communities of the telecommunications network illustrated in FIGS. 7 and 8 may be contrasted with similar data for a social network illustrated in FIGS. 9 and 10. The social network under consideration includes 9377 nodes having 48210 links between them. Following community identification, a total of 53 communities may be identified within the network. The table of FIG. 9 illustrates structural analysis details for those communities of the network having more than 100 nodes. The table can be seen to include the number of each type of triad within each community, ranging form type 4 to type 16. The total number of triads within each community is also indicated. The structural analysis details for community 52 are also illustrated pictorially in FIG. 10, which includes a representative illustration of each triad type from 4 to 16. The number of triads of each type found within community 52 is noted beneath the representative illustrations. Consideration of FIGS. 9 and 10 indicates that the predominant triad types for all the communities considered are types 11 and 15. There are relatively highly interconnected triad types, indicating that the communities are relatively tightly coupled, having a high level of interconnection and potential for information exchange within the communities.

Figures 11, 12, 13, 14, 15:
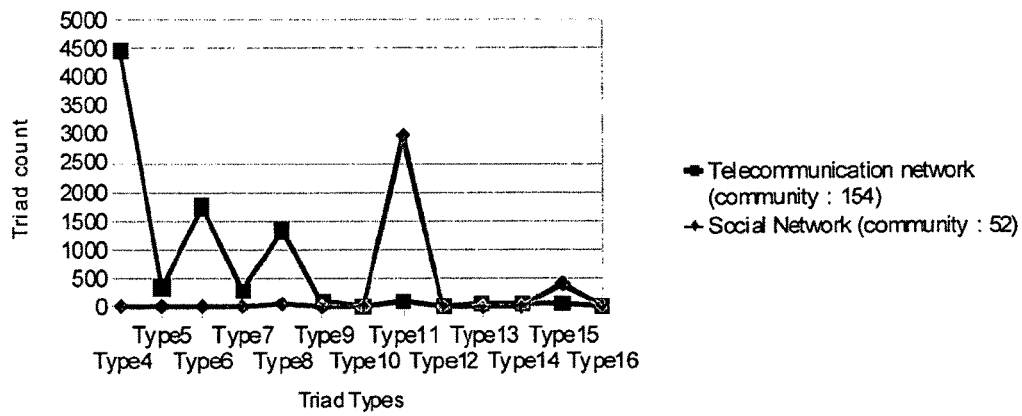
FIG. 11 is a graph comparing the triadic structure of the two communities illustrated in FIGS. 8 and 10.
FIG. 12 shows community details for communities from the networks of FIGS. 7 and 9 before triadic closure.
FIG. 13 shows community details for the communities of FIG. 12 after triadic closure.
FIG. 14 shows community details for communities from the networks of FIGS. 7 and 9 before focal closure.
FIG. 15 shows community details for the communities of FIG. 14 after focal closure.

The contrast between the community structures of the telecommunications and social network can be clearly seen in FIG. 11, which is a graphical representation of the triadic structure of a representative community from each of the telecommunications and social networks. The telecommunications network community 154 has a main peak at type 4, with lesser peaks at types 6 and 8, while the social network community 52 has a main peak at type 11, with a lesser peak at type 15.

Returning to the telecommunications network, consideration of FIG. 7 indicates that communities 1269 and 13 from this network have a similar number of nodes but varying levels of interconnection between the nodes. FIG. 12 compares the two communities, and shows that community 1269 has considerably fewer links, with a poorer cost performance than community 13. FIG. 13 shows the same communities following the application of triadic closure to community 1269. The number of links in community 1269 can be seen to have increased dramatically, bringing the cost performance of community 1269 up to a level approaching that of community 13.

Figure 16:
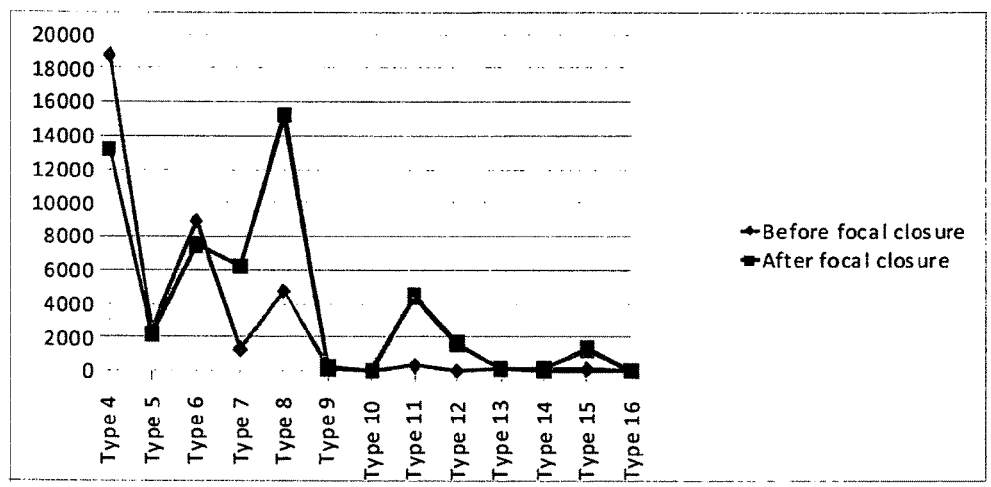
FIG. 16 is a graph showing a comparison of triadic structure in a community before and after focal closure.

FIG. 14 shows a comparison of communities 13, 1269 and 2007 of the telecommunications network. Following clustering, it can be seen that communities 13 and 1269 each belong to a cluster 1, which is a relatively higher performing cluster, while community 2007 belongs to a cluster 0, which is a lower performing cluster. FIG. 15 shows the same communities following the application of focal closure to community 2007. It can be seen that the number of links in community 2007 has increased considerably, and on re-running the clustering algorithm, community 2007 is seen to move into the higher performing cluster. FIG. 16 is a graphical representation of the triadic structure of community 2007 before and after focal closure. The main peak in triad type can be seen to have moved form type 4 to type 8, with new lesser peaks at types 11 and 15, representing the greater levels of interconnection following focal closure.

Figure 17:
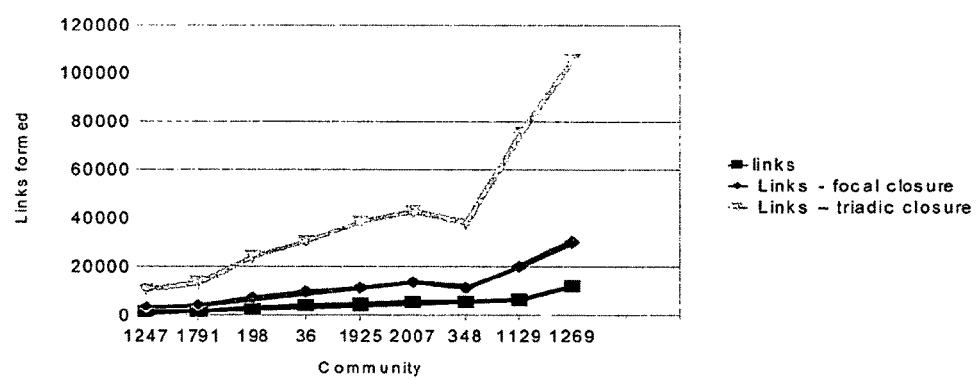
FIG. 17 is a graph illustrating connectivity of communities in an original state, following focal closure and following triadic closure.

The increase in links within communities following focal and triadic closure is illustrated graphically in FIG. 17. Here it can be seen that each closure method generates increased links, with triadic closure generating more links than focal closure. This demonstrates the difference between triadic closure, which simply produces new links, and focal closure, which prioritises the quality of new links. Triadic closure has the advantage of creating large numbers of new links and being relatively simple to implement from a processing point of view. However, the increase in number of links may not necessary translate efficiently into increased traffic within the community. The advantage of focal closure is that, while fewer links may be created, these links are more likely to generate increased information exchange, being based on a shared focus between the nodes that are newly connected. An appropriate closure method may be selected according to the particular constraints and priorities that may apply to the operator of any given network on which the present invention is implemented.

The above examples demonstrate how embodiments of the present invention achieve an increase in network performance in a fast and efficient manner. By analysing network performance on a community scale, the method facilitates an understanding in network operators of the structure and needs of the different groups forming their customer base, as well as targeting those areas of the network which experience the greatest proportion of network traffic. Embodiments of the invention target lower performing communities, and may target those lower performing communities which have the greatest potential for performance improvement. In addition, embodiments of the present invention provide for the modification of community structures in such a way as to raise the level of interconnectedness within communities, introducing new links into the network and prioritising the formation of links which are based on a mutual shared focus, and thus have the greatest potential to generate increased network traffic and corresponding increased operator profit.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method by a computer for introducing connections among users of a network, comprising:
   identifying at least two communities of users within the network;
   analyzing a structure of each community;
   clustering the communities according to community performance into a first cluster and a second cluster, the first cluster comprising communities with lower performance than communities comprised in the second cluster;
   comparing a structure of a community from the first cluster with a structure of a community from the second cluster; and
   the computer changing the structure of the community from the first cluster in order to increase a similarity measure between the community from the first cluster and the community from the second cluster, wherein changing the structure of the community from the first cluster comprises identifying an open triad and effecting closure of the identified open triad.

2. The method as claimed in claim 1, wherein comparing the structure of the community from the first cluster with the structure of the community from the second cluster comprises conducting an isomorphic comparison of triad structures.

3. The method as claimed in claim 1, wherein the comparison is effected between communities having a comparable number of users.

4. The method as claimed in claim 1, wherein analyzing the structure of each community comprises identifying triads within each community and analyzing a structure of each triad.

5. The method as claimed in claim 4, wherein clustering the communities according to the community performance comprises clustering the communities according to the triad structures.

6. The method as claimed in claim 1, wherein effecting closure comprises conducting focal closure.

7. The method as claimed in claim 1, wherein effecting closure comprises conducting triadic closure.

8. The method as claimed in claim 1, wherein the network comprises a telecommunications network.

9. The method as claimed in claim 1, wherein the network comprises a social network.

10. The method of claim 1, wherein the similarity measure between communities c and c' is defined as:

$$\mu(c, c') = 1 - \left[\frac{msc(c, c')}{\max(c, c')}\right]$$

wherein $\mu(c,c')$ is the similarity measure between the communities c and c', $msc(c,c')$ is the maximum common structure between the communities c and c', and $\max(c,c')$ is the maximum number of nodes that can exist in either of the two communities c and c'.

11. A computer program product comprising a non-transitory computer readable medium storing computer program code which when executed by a processor causes the processor to perform operations to introduce connections among users of a network, the operations comprising:
   identifying at least two communities of users within the network;
   identifying triads within each community and analyzing a structure of each triad;
   clustering the communities according to community performance into a first cluster and a second cluster, the first cluster comprising communities with lower performance than communities comprised in the second cluster;
   conducting an isomorphic comparison of a structure of a community from the first cluster with a structure of a community from the second cluster; and
   changing the structure of the community from the first cluster in order to increase a similarity measure between the community from the first cluster and the community from the second cluster, wherein in changing the structure of the community from the first cluster, the computer program code causes the processor to identify an open triad and effect closure on the identified open triad.

12. The computer program product as claimed in claim 11, wherein changing the structure of the community from the first cluster comprises conducting focal closure.

13. The computer program product as claimed in claim 11, wherein changing the structure of the community from the first cluster comprises conducting triadic closure.

14. An apparatus configured to introduce connections among users in a network, comprising:
   a processor; and
   a non-transitory computer readable medium storing computer program code which, when executed by the processor, causes the apparatus to:
   identify at least two communities of users within the network;
   identify triads within each community and analyze a structure of each triad;
   cluster the communities according to community performance into a first cluster and a second cluster, the first cluster comprising communities with lower performance than communities comprised in the second cluster;
   conduct an isomorphic comparison of a structure of a community from the first cluster with a structure of a community from the second cluster; and
   change the structure of the community from the first cluster in order to increase a similarity measure between the community from the first cluster and the community from the second cluster, wherein in changing the structure of the community from the first cluster, the computer program code causes the apparatus to identify an open triad and effect closure on the identified open triad.

15. The apparatus as claimed in claim 14, wherein in effecting closure, the computer program code causes the apparatus to effect focal closure.

16. The apparatus as claimed in claim 14, wherein in effecting closure, the computer program code causes the apparatus to effect triadic closure.

\* \* \* \* \*

UNITED STATES PATENT AND TRADEMARK OFFICE
CERTIFICATE OF CORRECTION

PATENT NO. : 9,692,651 B2
APPLICATION NO. : 14/391676
DATED : June 27, 2017
INVENTOR(S) : Mohan et al.

Page 1 of 2

It is certified that error appears in the above-identified patent and that said Letters Patent is hereby corrected as shown below:

In the Drawings

In Fig. 6, Sheet 3 of 7, for Tag "350", in Line 1, delete "Comunity" and insert -- Community --, therefor.

In the Specification

In Column 5, Line 62, delete "different form" and insert -- different from --, therefor.

In Column 7, Lines 8-9, delete "range form" and insert -- range from --, therefor.

In Column 8, Line 56, delete "$\mu(c,c^I)=1-[mcs(c,c^I)/max(c,c^I)]$" and insert -- $\mu(c,c')=1-[mcs(c,c')/max(c,c')]$ --, therefor.

In Column 8, Line 58, delete "$\mu(c,c^I)$" and insert -- $\mu(c,c')$ --, therefor.

In Column 8, Line 59, delete "$mcs(c, c^I)$" and insert -- $mcs(c,c')$ --, therefor.

In Column 8, Line 60, delete "c and $c^I$;" and insert -- c and c'; --, therefor.

In Column 8, Line 61, delete "max(c,cI)" and insert -- max(c,c') --, therefor.

In Column 9, Lines 17-18, delete "use focal" and insert -- use of focal --, therefor.

In Column 9, Line 26, delete "differs form" and insert -- differs from --, therefor.

In Column 10, Line 46, delete "and or" and insert -- and/or --, therefor.

In Column 11, Line 33, delete "ranging form" and insert -- ranging from --, therefor.

Signed and Sealed this
Seventh Day of April, 2020

Andrei Iancu
*Director of the United States Patent and Trademark Office*

CERTIFICATE OF CORRECTION (continued)
U.S. Pat. No. 9,692,651 B2

In Column 11, Line 57, delete "ranging form" and insert -- ranging from --, therefor.

In Column 12, Line 37, delete "moved form" and insert -- moved from --, therefor.

In Column 12, Line 50, delete "necessary" and insert -- necessarily --, therefor.